(12) United States Patent
Tokarz et al.

(10) Patent No.: US 12,414,650 B2
(45) Date of Patent: Sep. 16, 2025

(54) COOKING RACK

(71) Applicant: Mario's Backyard, LLC, Attica, MI (US)

(72) Inventors: Steven Tokarz, Superior Township, MI (US); Mario Damico, Attica, MI (US); Brennan Vaughn, Mattawan, MI (US)

(73) Assignee: Mario's Backyard, LLC, Attica, MI (US)

( * ) Notice: Subject to any disclaimer, the term of this patent is extended or adjusted under 35 U.S.C. 154(b) by 590 days.

(21) Appl. No.: 17/690,778

(22) Filed: Mar. 9, 2022

(65) Prior Publication Data

US 2022/0287503 A1 Sep. 15, 2022

Related U.S. Application Data

(60) Provisional application No. 63/158,505, filed on Mar. 9, 2021.

(51) Int. Cl.
*A47J 37/06* (2006.01)
*A47J 43/18* (2006.01)
*F24C 15/16* (2006.01)

(52) U.S. Cl.
CPC .......... *A47J 37/0694* (2013.01); *A47J 43/18* (2013.01); *F24C 15/16* (2013.01); *A47J 37/0664* (2013.01)

(58) Field of Classification Search
CPC .... A47J 43/18; A47J 37/0694; A47J 37/0664; A47J 37/0878; F24C 15/16
USPC ................................. 99/426, 448; 211/181.1
See application file for complete search history.

(56) References Cited

U.S. PATENT DOCUMENTS

| | | | |
|---|---|---|---|
| 4,848,217 A * | 7/1989 | Koziol | A47J 37/0694 99/426 |
| 5,730,046 A | 3/1998 | Battaglia et al. | |
| 5,823,100 A * | 10/1998 | Wienhold | F24C 15/16 248/172 |
| 6,131,506 A * | 10/2000 | Kemper | A47J 37/0694 99/425 |
| 6,827,006 B1 | 12/2004 | D'Amato et al. | |
| 6,945,161 B1 | 9/2005 | Battaglia et al. | |
| 7,040,219 B1 | 5/2006 | D'Amato et al. | |
| 2005/0279223 A1 | 12/2005 | McPeak | |
| 2007/0261569 A1 | 11/2007 | D'Amato et al. | |
| 2009/0020491 A1* | 1/2009 | Foster | A47J 37/0786 99/450 |
| 2011/0113974 A1 | 5/2011 | D'Amato et al. | |

FOREIGN PATENT DOCUMENTS

GB 2595284 A * 11/2021 ............. A47J 43/18

* cited by examiner

*Primary Examiner* — Reginald Alexander

(57) ABSTRACT

A cooking rack according to an example of the present disclosure includes, among other possible things, a top grate extending between a first end portion and a second end portion, a base extending between a first end portion and a second end portion, the base spaced apart from the top grate, a first support supporting the first end portion of the top grate with respect to the first end portion of the base, a second support supporting the second end portion of the top grate with respect to the second end portion of the base, and first and second rails situated between the top grate and the base. A method of cooking and another example cooking rack are also disclosed.

16 Claims, 5 Drawing Sheets

COOKING RACK

CROSS-REFERENCE TO RELATED APPLICATIONS

This application claims priority to U.S. Provisional Application Ser. No. 63/158,505 filed Mar. 9, 2021, which is hereby incorporated by reference in its entirety.

BACKGROUND

Many foods benefit from being elevated or suspended with respect to a heat source during cooking. This allows for improved air circulation around the food for even cooking. Also, minimizing points of contact between the foods and heated surfaces such as a cooking grate of a barbeque reduces the risk of burning or sticking.

Moreover, in certain circumstances it may be advantageous to cook multiple foods simultaneously. However, the foods may have different shapes, sizes, and cooking requirements. This is especially important for chicken drumsticks, ribs, and chicken parts such as wings, wingdings and breast.

SUMMARY

A cooking rack according to an example of the present disclosure includes, among other possible things, a top grate extending between a first end portion and a second end portion, a base extending between a first end portion and a second end portion, the base spaced apart from the top grate, a first support supporting the first end portion of the top grate with respect to the first end portion of the base, a second support supporting the second end portion of the top grate with respect to the second end portion of the base, and first and second rails situated between the top grate and the base.

A method of cooking food using a cooking rack according to an example of the present disclosure includes, among other possible things, placing a cooking rack on a cooking surface, and arranging food on the cooking rack so that it is suspended with respect to the cooking surface. The cooking rack includes a top grate extending between a first end portion and a second end portion, a base extending between a first end portion and a second end portion, the base spaced apart from the top grate, a first support supporting the first end portion of the top grate with respect to the first end portion of the base, a second support supporting the second end portion of the top grate with respect to the second end portion of the base, first and second rails situated between the top grate and the base.

A cooking rack according to an example of the present disclosure includes, among other possible things, a top grate extending between a first end portion and a second end portion, a base extending between a first end portion and a second end portion, the base spaced apart from the top grate, a first support supporting the first end portion of the top grate with respect to the first end portion of the base, a second support supporting the second end portion of the top grate with respect to the second end portion of the base, and a side hanger extending outwardly from the top grate.

DETAILED DESCRIPTION

The present disclosure relates to a cooking rack that can be used on a hot environment such as an open fire, oven, barbeque, or smoker to hold foods in an elevated or suspended position with respect to a heat source.

Figure 1:
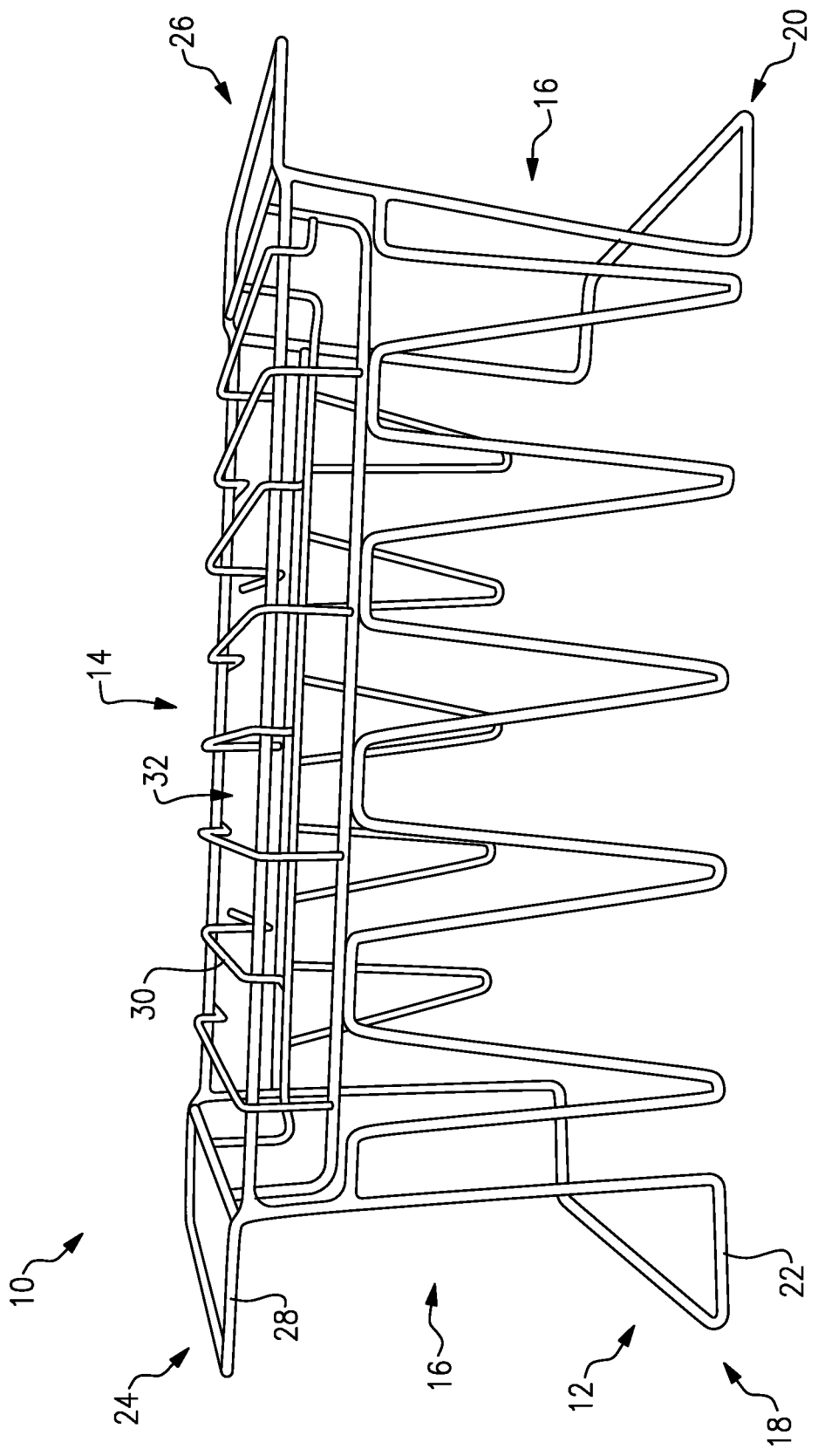
FIG. 1 illustrates an example a cooking rack.

FIG. 1 illustrates an example cooking rack 10. The rack 10 includes a base 12 and a top grate 14 spaced apart from the base 12. As shown, the base 12 is supported on the top grate 14 via supports 16.

Figure 2:
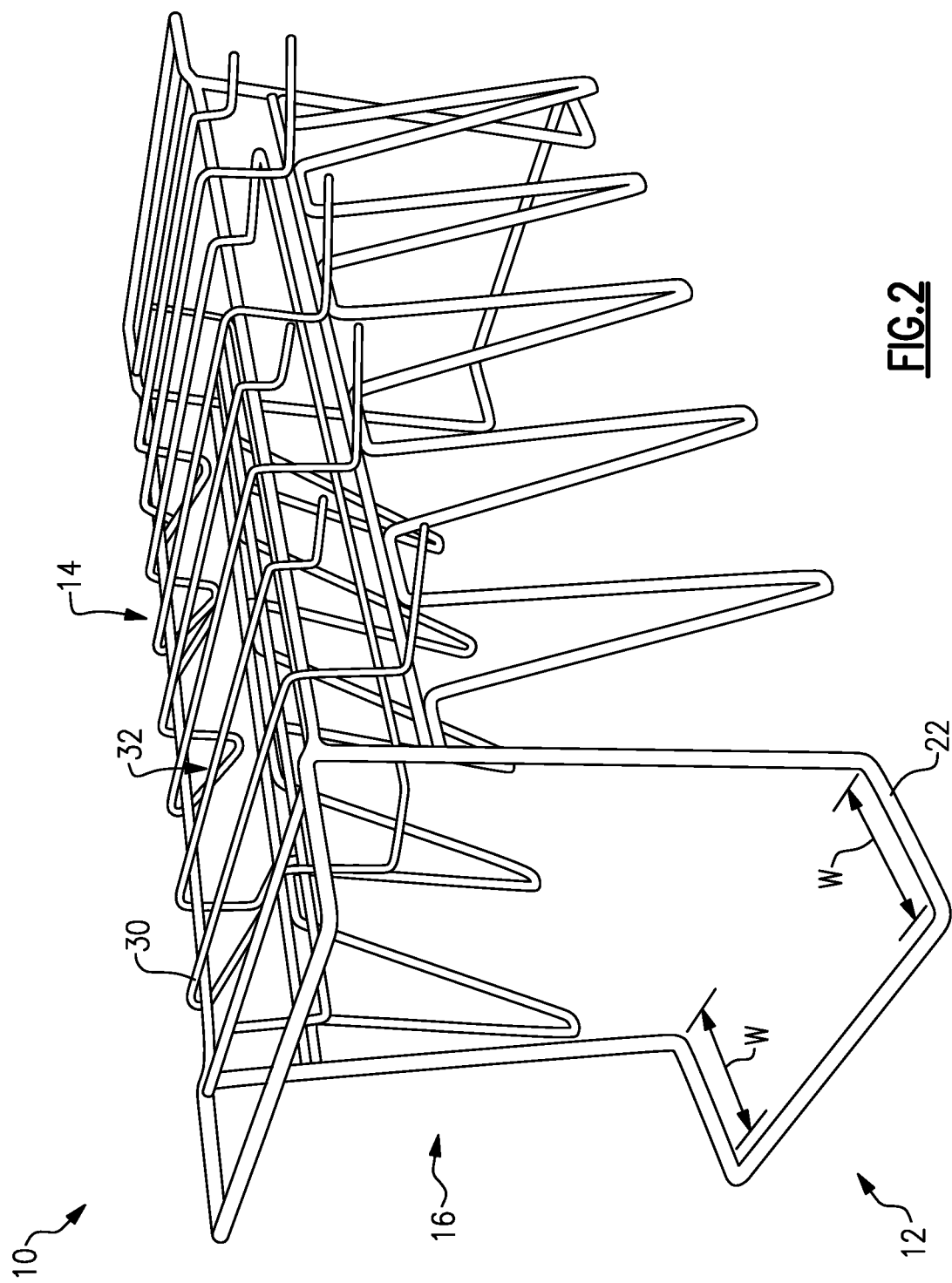
FIG. 2 shows a perspective view of the cooking rack of FIG. 1.

Referring to FIG. 2 with continued reference to FIG. 1, the base 12 extends between a first end portion 18 and a second end portion 20. Each of the first and second end portions 18, 20 can include feet 22. In one example, the feet 22 extend perpendicularly outward with respect to the supports 16 such that the feet 22 have a width W. Similarly, the top grate 14 extends between a first end portion 24 and a second end portion 26. Each of the first and second end portions 24, 26 can include one or more handles 28. In one example, the handles 28 also extend perpendicularly outward with respect to the supports 16. In some examples, the placement and/or geometry of the handles 28 corresponds to the placement of the feet 22. The handles 28 allow a user to readily place the rack 10 where desired and/or move the rack 10.

In one example, the cooking rack 10 can be placed directly onto a cooking surface, such as a grate of a barbeque or directly onto an oven rack. In these examples, the width W of the feet 22 is greater than the spacing of the grate of the barbeque or oven rack so that the feet 22 stabilize the rack 10 and allow it to sit flat on the cooking surface. In another example, the cooking rack 10 can be placed onto a baking sheet or pan. The same can occur in an open fire, smoker, or similar heat source.

Figure 3:
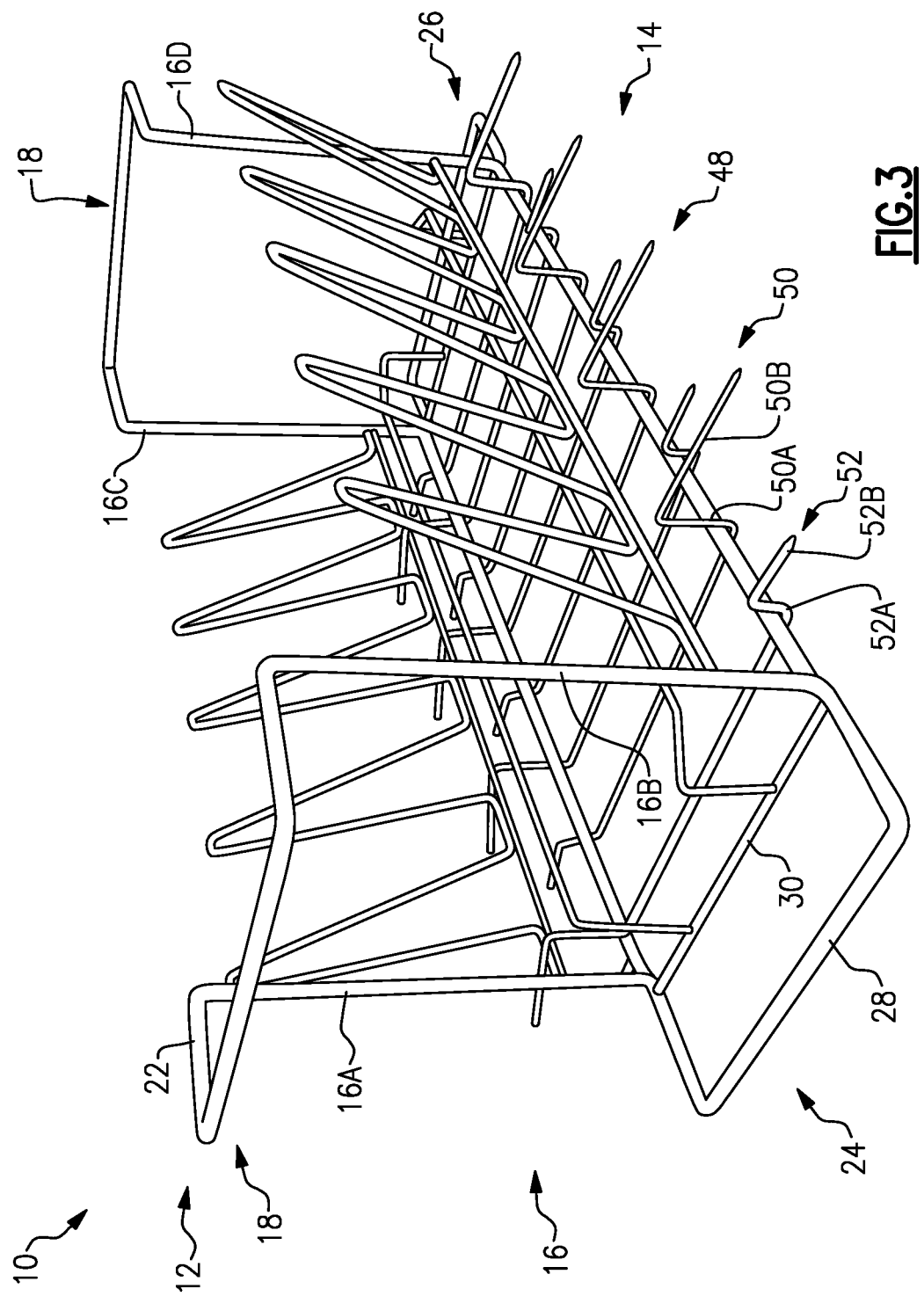
FIG. 3 shows another perspective view of the cooking rack of FIG. 1.

In one example, as shown in FIG. 3, the supports 16 can include a first support 16A, a second support 16B, a third support 16C, and a fourth support 16D. In this example, the first and second supports 16A/16B are configured to connect the first end portion 18 of the base 12 to the first end portion 24 of the top grate 14. In addition, the third and fourth supports 16C/16D are configured to connect the second end portion 20 of the base 12 to the second end portion 26 of the top grate 14. In this example, the base 12 and top grate 14 have a rectangular shape defined by a length and a width, and four corners. Accordingly, one of the supports 16A/16B/16C/16D is positioned at each of the four corners. The supports 16 space the base 12 apart from the top grate 14.

Referring back to FIGS. 1-2, the top grate 14 includes rods 30 that extend across the top grate 14. Between adjacent rods 30 are gaps 32. In some examples, the gaps 32 are smaller than the width W of the feet 22. The rods 30 can extend across the width of the cooking rack 10 where the top grate 14/base 16 have a generally rectangular shape. The diameter of the rods 30 can be balanced with the number of rods 30. The rods 30 are configured to support a wide variety of foods for cooking, including but not limited to sausages, seafood such as salmon filets, steaks, etc. Because the top grate 14 is elevated from the cooking surface, it allows for more even circulation of hot air around the food, thus encouraging even cooking and reducing the risk of the food burning or sticking to the cooking surface.

In addition to the top grate 14, the rack 10 includes one or more optional components for holding food elevated/suspended from the cooking surface.

Figure 4:
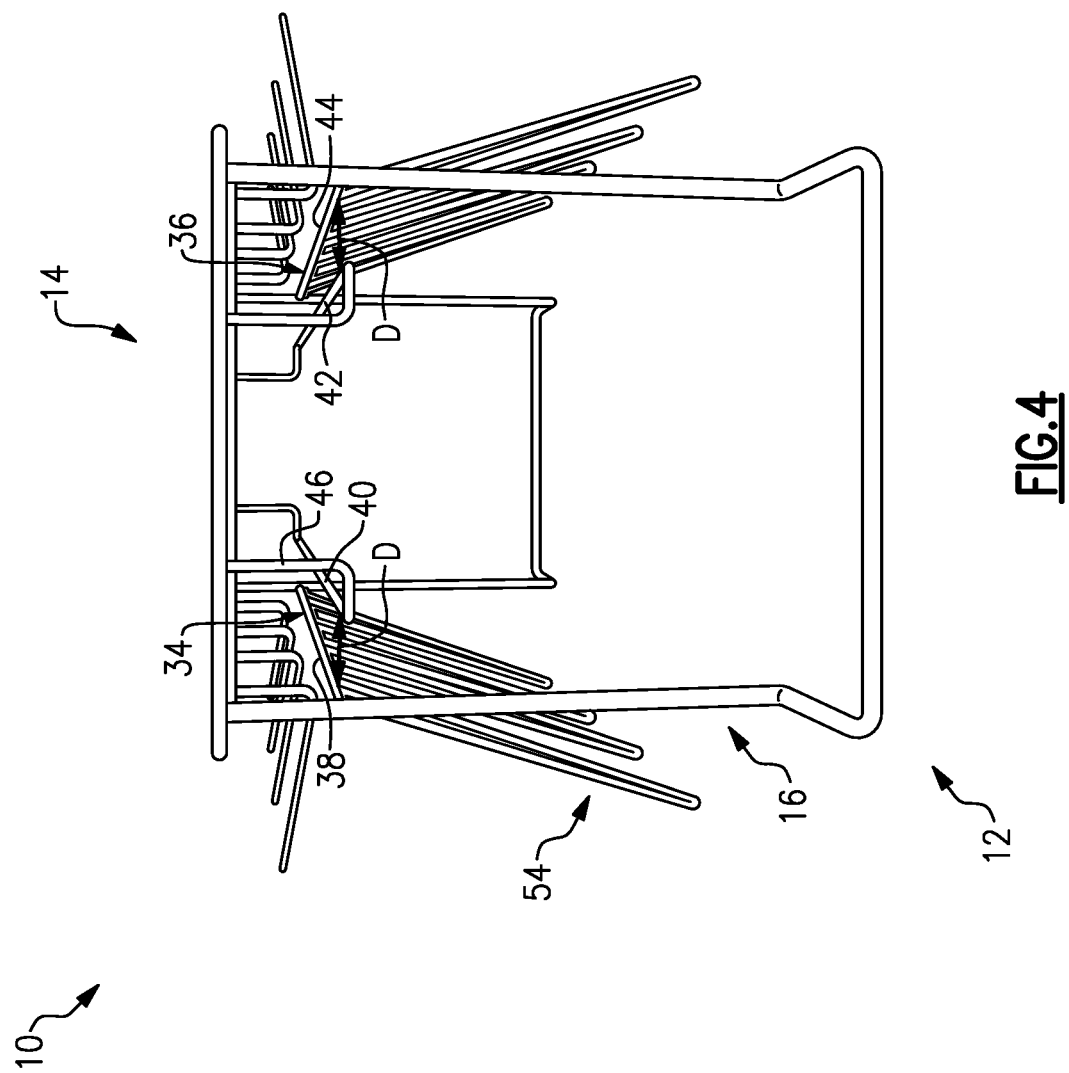
FIG. 4 shows a side view of the cooking rack of FIG. 1.
Figure 5:
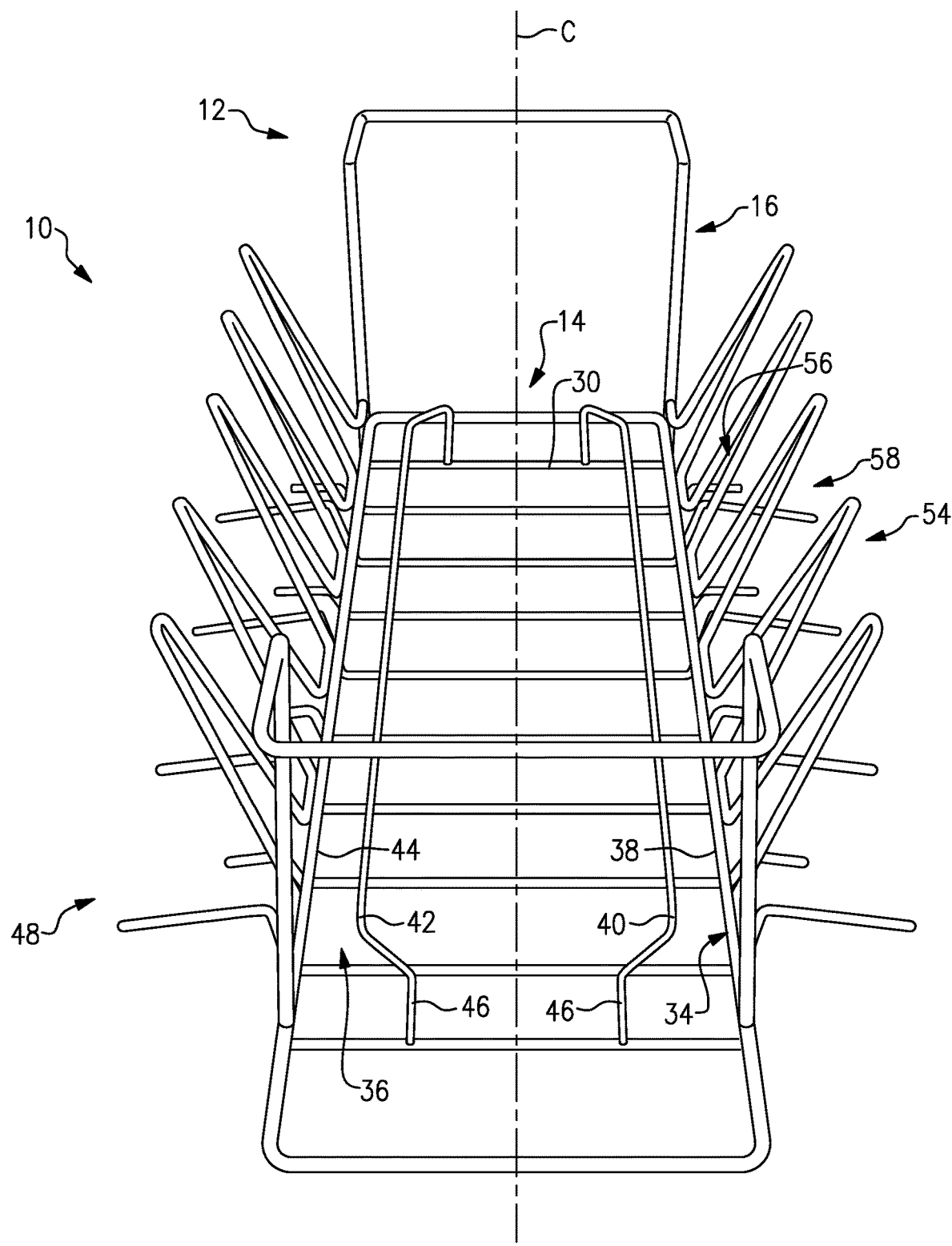
FIG. 5 shows another view of the cooking rack of FIG. 1.

Referring to FIGS. 4 and 5, in one example, the optional component is at least one set of rails 34/36 between the base 12 and the top grate 14. In the example of FIG. 4, there are two sets of rails 34/36, but in other examples there could be one set of rails or more than two sets of rails. In this example, the first set of rails 34 includes a first outer rail 38 and a first inner rail 40. Similarly, the second set of rails 36 includes a second inner rail 42 and a second outer rail 44. The sets of rails 34/36 extend along the length of the top grate 14 on opposite sides of the top grate 14 where the top grate 14/base 16 have a generally rectangular shape. In a particular example, the inner rails 40/42 in each set of rails 34/36 is connected to the top grate 14 by connectors 46. The outer rails 38/44 in each set of rails 34/36 extend between supports 16.

The rails in each set of rails 34/36 are spaced apart by a distance D. The distance D is selected to hold the thinner end of a chicken drumstick between the rails 34/36. In some examples, the distance D is about 1 inch. One or more chicken drumsticks can be slid in between the rails 34/36, and thus the chicken drumsticks can be suspended from the sets of rails 34/36 over the cooking surface, with the thicker end closer to the cooking surface and the thinner end further from the cooking surface. As discussion above, suspending the chicken drumsticks in this way allows for even cooking and reduces the risk of the chicken drumsticks from burning or sticking to the cooking surface. Moreover, juices released from the chicken drumsticks during cooking are pulled down the length of the drumsticks by gravity, keeping the chicken drumsticks moist.

Referring back to FIG. 3, another example component is one or more brackets 48. The brackets 48 can extend from individual rods 30 of the top grate 14, and in some examples can be integral with individual rods 30 of the top grate 14. In one example, the brackets 48 include large brackets 50 and small brackets 52. The brackets 50 include a downward extension 50A, which extends down from the top grate 14 towards the base 12, and an outward extension 50B which extends outward from the downward extension 50A to provide an "L" shape. Similarly, the small brackets 52 include a downward extension 52A, which extends down from the top grate 14 towards the base 12, and an outward extension 52B which extends outward from the downward extension 52A to provide an "L" shape.

In some examples, large brackets 50 and small brackets 52 may be provided in an alternating or another arrangement. The small brackets 52 may have smaller downward extensions 52A, outward extensions 52B, or both as compared to the large brackets 50. In some examples, the outward extensions 50B/52B extends outward from the downward extensions 50B/52B at an angle equal to or less than about 90 degrees.

As used herein, the term "about" has the typical meaning in the art, however in a particular example "about" can mean deviations of up to 30% of the values described herein.

The brackets 48 can support foods that have at least one small dimension, such as sausages, chicken wings, or vegetables. Foods can either rest on top of the outward extension(s) 50B/52B of the bracket(s) 50B/52B or can be pierced onto the outward extension(s) 50B/52B of the bracket(s) 50/52. In one example, ends of the outward extensions 50B/52B have a diameter that is less than the diameter of the rods 30. As a result, the ends of the outward extensions 50B/52B are sharp enough to pierce food. As with the rails 34/36, the brackets 48 allow food to be suspended from the cooking surface, which allows for more even air cooking due to improved air circulation around the foods.

With further reference to FIG. 5, another example component is side hangers 54. In one example, the side hangers 54 can extend outward from the top grate 14. More particularly, the side hanger 54 can hang from the outer rails 38/44 of the sets of rails 34/36 or from the supports 16. The side hangers 54 have a corrugated structure that defines first and second alternating sets of openings 56/58. The sets of openings 56/58 can have the same or different geometries. In one example, a first set of openings 56 has a triangular geometry and the second set of openings 58 has a trapezoidal geometry with squared off ends. In the example of FIG. 5, the side hangers 54 are formed of a single continuous piece. For instance, the single piece side hangers 54 includes a unitary structure formed into the corrugated shape. In other examples, the side hangers 54 are formed of multiple separate pieces that together define the corrugated structure.

In some examples, the side hangers 54 may hang such that each one of the side hangers 54 are oriented approximately perpendicular to the top grate 14. In some examples, the side hangers 54 may be angled with respect to the top grate 14 such that each one of the side hangers 54 is angled away from a centerline C of the rack 10. The openings 56/58 are configured to receive small foods such as chicken wings as well as slabs of meat or ribs and support the foods away from the cooking surface. As with the rails 34/36 and brackets 48, the side hanger 26 allows for more even air cooking due to improved air circulation around the foods.

The various components described above may be removable from the rack 10 for easy cleaning and storage, in some examples.

The cooking rack 10 can be made from stainless steel or another suitable material. In some examples, the material prevents or reduces sticking of foods to the rack 10. Nonstick or stick-resistant materials suitable for cooking are well known in the art.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:
1. A cooking rack, comprising:
a top grate extending between a first end portion and a second end portion;
a base extending between a first end portion and a second end portion, the base spaced apart from the top grate;
a first support supporting the first end portion of the top grate with respect to the first end portion of the base;
a second support supporting the second end portion of the top grate with respect to the second end portion of the base;
first and second rails situated between the top grate and the base, and
a plurality of rods extending across the top grate, wherein at least one of the plurality of rods includes a bracket, and the bracket includes a downward extension that extends down from the top grate towards the base, and an outward extension that extends outwards from the downward extension.

2. The cooking rack of claim 1, wherein the bracket includes a first bracket and a second bracket, wherein the downward extension of the second bracket is smaller than the downward extension of the first bracket or the outward extension of the second bracket is smaller than the outward extension of the first bracket.

3. The cooking rack of claim 1, wherein the bracket is configured to receive food on the outward extension.

4. The cooking rack of claim 1, wherein the outward extension is configured to pierce through food.

5. The cooking rack of claim 1, wherein each of the first and second end portions of the top grate includes a handle.

6. The cooking rack of claim 1, wherein each of the first and second end portions of the base includes a foot.

7. The cooking rack of claim 1, wherein the first and second rails are spaced apart by a distance D.

8. The cooking rack of claim 7, wherein a space between the first and second rails is configured to receive food such that the food is held between the first and second rails and suspended below the top grate.

9. The cooking rack of claim 1, further comprising a side hanger extending from at least one of the first and second supports or at least one of the first and second rails.

10. The cooking rack of claim 9, wherein the side hanger includes a corrugated structure that defines first and second sets of alternating openings.

11. The cooking rack of claim 1, wherein the first and second rails are on a first side of the cooking rack, and further comprising third and fourth rails situated between the top grate and the base on a second side of the cooking rack opposite the first side.

12. The cooking rack of claim 11, wherein each of the top grate and the base have a rectangular shape defined by a length and a width, and four corners, and further comprising third and fourth supports such that one of the first, second, third, and fourth supports is positioned at each corner.

13. A cooking rack, comprising:
a top grate extending between a first end portion and a second end portion;
a base extending between a first end portion and a second end portion, the base spaced apart from the top grate;
a first support supporting the first end portion of the top grate with respect to the first end portion of the base;
a second support supporting the second end portion of the top grate with respect to the second end portion of the base;
a side hanger extending outwardly from the top grate;
first and second rails situated between the top grate and the base; and
a plurality of rods extending across the top grate, wherein at least one of the plurality of rods includes a bracket, and the bracket includes a downward extension that extends down from the top grate towards the base, and an outward extension that extends outwards from the downward extension.

14. The cooking rack of claim 13, wherein the side hanger includes a corrugated structure that defines first and second sets of alternating openings, the first set of openings have a triangular geometry and the second set of opening have a trapezoidal geometry with squared-off ends, and the first set of openings is configured to receive food therein.

15. A cooking rack, comprising:
a top grate extending between a first end portion and a second end portion;
a base extending between a first end portion and a second end portion, the base spaced apart from the top grate;
a first support supporting the first end portion of the top grate with respect to the first end portion of the base;
a second support supporting the second end portion of the top grate with respect to the second end portion of the base;
first and second rails situated between the top grate and the base; and
a side hanger extending from at least one of the first and second supports or at least one of the first and second rails.

16. The cooking rack of claim 15, wherein the side hanger includes a corrugated structure that defines first and second sets of alternating openings.

\* \* \* \* \*